United States Patent
Crowe et al.

(10) Patent No.: US 10,167,431 B2
(45) Date of Patent: Jan. 1, 2019

(54) PINNED FURNACE TUBES

(71) Applicant: NOVA Chemicals (International) S.A., Fribourg (CH)

(72) Inventors: Jeffrey Stephen Crowe, Calgary (CA); Mark Andrew Taylor, Red Deer (CA)

(73) Assignee: NOVA Chemicals (International) S.A., Fribourg (CH)

( * ) Notice: Subject to any disclaimer, the term of this patent is extended or adjusted under 35 U.S.C. 154(b) by 881 days.

(21) Appl. No.: 14/278,379

(22) Filed: May 15, 2014

(65) Prior Publication Data

US 2014/0374213 A1 Dec. 25, 2014

(30) Foreign Application Priority Data

Jun. 20, 2013 (CA) ..................... 2818870

(51) Int. Cl.
    *B01J 8/00* (2006.01)
    *C10G 9/20* (2006.01)

(52) U.S. Cl.
    CPC ............... *C10G 9/20* (2013.01); *C10G 9/203* (2013.01); *Y02P 30/10* (2015.11); *Y10T 29/49364* (2015.01)

(58) Field of Classification Search
    CPC .... B01J 2208/00106; B01J 2219/00074; B01J 8/0285; B01J 8/0496; B01J 8/067; B01J 8/1836; B01J 8/087
    USPC ....................................... 422/198
See application file for complete search history.

(56) References Cited

U.S. PATENT DOCUMENTS

| | | | |
|---|---|---|---|
| 3,476,180 A | 11/1969 | Straight, Jr. et al. | |
| 5,437,247 A | 8/1995 | Dubil et al. | |
| 5,950,718 A | 9/1999 | Sugitani et al. | |
| 6,250,340 B1 | 6/2001 | Jones et al. | |
| 2012/0275966 A1* | 11/2012 | Petela | B01J 19/0013 422/198 |

FOREIGN PATENT DOCUMENTS

CA    1309841    11/1992

OTHER PUBLICATIONS

Detemmerman, T. and Froment, F.; Three Dimensional Coupled Simulation of Furnaces and Reactor Tubes for the Thermal Cracking of Hydrocarbons; Revue de L'Institut Francais de Petrole, vol. 53, No. 2, Mar.-Apr. 1998, pp. 181-194.

De Saegher, J.J., Detemmerman, T. and Froment, G.F.; Three Dimensional Simulation of High Severity Internally Finned Cracking Coils for Olefins Production; Revue de L'Institut Francais de Petrole, vol. 51, No. 2, Mar.-Apr. 1996, pp. 245-260.

* cited by examiner

*Primary Examiner* — Huy Tram Nguyen
(74) *Attorney, Agent, or Firm* — Julie L. Heinrich

(57) ABSTRACT

Furnace tubes for cracking hydrocarbons that in an embodiment have a longitudinal array of pins having i) a maximum height from about 2 to about 4.8 cm; ii) a contact surface with the tube, having an area from about 0.1% to about 10% of the tube external cross section area iii) a uniform cross section along the length of the pin. (i.e., they are typically not tapered); and iv) a length to diameter ratio from about 4:1 to about 2:1 have an improved heat transfer over bare fins and reduced stress relative to a fined tube.

15 Claims, 11 Drawing Sheets

F: Bare
Equivalent Stress
Type: Equivalent (von-Mises) Stress
Unit: MPa
Time: 1
3/28/2013 9:16 AM 60.951 Max
54.188
47.424
40.661
33.898
27.135
20.372
13.609
6.8457
0.082552 Min AG: Pin Tube
Equivalent Stress
Type: Equivalent (von-Mises) Stress
Unit: MPa
Time: 1
3/28/2013 1:00 PM 71.04 Max
63.152
55.263
47.374
39.485
31.597
23.708
15.819
7.9305
0.041738 Min F: Bare
Equivalent Stress
Type: Equivalent (von-Mises) Stress
Unit: MPa
Time: 1
3/28/2013 9:16 AM 60.951 Max
54.188
47.424
40.661
33.898
27.135
20.372
13.609
6.8457
0.082552 Min K: Straight
Equivalent Stress
Type: Equivalent (von-Mises) Stress
Unit: MPa
Time: 1
3/28/2013 1:05 PM 487.72 Max
433.58
379.45
325.31
271.17
217.03
162.9
108.76
54.622
0.4845 Min AG: Pin Tube
Equivalent Stress
Type: Equivalent (von-Mises) Stress
Unit: MPa
Time: 1
3/28/2013 1:00 PM 71.04 Max
63.152
55.263
47.374
39.485
31.597
23.708
15.819
7.9305
0.041738 Min

PINNED FURNACE TUBES

FIELD

The present invention relates to the field of cracking paraffins to olefins and more particularly, to pins (spines or studs) in a longitudinal array on the external surface of the process coil(s) in the radiant section of a cracking furnace. The pins can be spaced apart in a regular pattern, or the spacing and length of the pins may vary to provide a profile to the array of pins. The profile of the array may be varied depending on the exposure of the coil to local radiation intensity in a furnace. A size of a single pin should be such that its base (a contact surface with a coil) should not exceed 10% of the coil cross section, and its height should not exceed 15% of the coil internal diameter.

These pins increase net transfer of radiant and convective heat from flame, combustion gases and surrounding furnace walls, into the external surface of the process coil.

BACKGROUND

The field of heat exchanger designs is replete with applications of fins to improve the heat transfer. Typically, this is heat transfer by forced convection mechanism. The heat transfer by forced convection takes place between a solid surface and fluid in motion, which may be gas or liquid, and it comprises the combined effects of conduction and fluid flow. This type of heat transfer occurs in most of the conventional heating systems, either hot water or electric and industrial heat exchangers.

In the cracking process of a paraffin, such as, ethane or naphtha, the feed flows through a furnace coil (pipe) that is heated up to 1100° C., inside the radiant section of a cracking furnace. At these temperatures, the feed undergoes a number of reactions, including a free radical decomposition (cracking), reformation of a new unsaturated product and the coproduction of hydrogen. These reactions occur over a very short period of time that corresponds to the feed residence time in a coil.

The interior of the radiant section of the furnace, is lined with heat absorbing/radiating refractory, and is heated typically by gas fired burners. The heat transfer within the furnace, between flame, combustion gases, refractory and the process coils is mostly by radiation, and also by (forced) convection.

A need exists for improvements to the efficiency of cracking furnaces as this reduces process costs and greenhouse gas emissions. There have been two main approaches to improving efficiency; improving heat transfer to the furnace coils, i.e., from flame, combustion gases and refractory walls to the external surface of a process coil, and improving heat transfer within the coil, i.e., from the coil walls into the feed flowing inside the coil.

One of the methods representing the second approach is the addition of internal fins to the inner walls of the furnace coil, to promote the "swirling" or mixing of the feed within the coil. This improves the convective heat transfer from the coil walls to the feed as the turbulence of the feed flow is increased and the heat transferring surface of the hot inner wall of the coil is increased as well.

While some believe that a tube with internal helicoidal fins performs better than a tube with internal longitudinal fins and that the results for "a tube with internal helicoidal fins are in excellent agreement with industrial observations." However, Applicants are not aware of any experimental data to support this belief. In addition Applicants are not aware of any comparisons made to the performance of a bare tube, with no internal ribs or fins. Tubes for use in the convection section of a cracking furnace, where the pins are on the surface of the downward face of the tubes in the convection section of the furnace are known. The pins are tightly packed and dimension for the length of the pins are unknown.

Elongated plates pivotably mounted on at least one horizontal tube in a vertical row that is one row removed from the wall are also known. When the plate is pivoted down, it prevents channeling of the hot gases through the convection section of the furnace (flue).

Putting "studs" ("pins") on the external and internal surfaces of pyrolysis coils used in the radiant section of a cracker is known. The pins are not arranged in longitudinal rows and have a length from 0.5 to 0.75 inches.

Pipes for chemical reactions, such as furnace tubes having internal grooves are also known.

Furnace tubes having studs 2 inches long and 0.5 cm in diameter placed in longitudinal arrays on the side of the furnace tube facing the refractory wall are also known.

A need exists for an enhanced heat transfer, comparable to that of a fin, while reducing the stress on the tube or pipe.

SUMMARY

The present invention provides a tube for use in the radiant section of a furnace for cracking hydrocarbons to produce olefins having on its exterior surface a series of pins in one or more linear arrays parallel to the longitudinal axis of the tube, said pins having:

i) a height from about 2 to about 4.8 cm (about 0.80 inches to about 1.90 inches) (e.g., from about 12 to about 50% of the tube outer diameter of the tube);

ii) a contact surface with the tube, having an area from about 0.1% to about 10% of the tube external cross-section area;

iii) length to diameter ratio from about 4:1 to about 2:1.

The present invention also provides the above tube wherein the distance between consecutive pins within a given linear array is from about 1 to about 5 times the maximum cross section of the pin.

The present invention also provides the above tube wherein the pins have a maximum height from about 12% to about 50% of the coil outer diameter.

The present invention also provides the above tube comprising from about 55 to about 65 weight % of Ni; from about 20 to about 10 weight % of Cr; from about 20 to about 10 weight % of Co; and from about 5 to about 9 weight % of Fe and the balance one or more of the trace elements.

The present invention also provides the above tube further comprising from about 0.2 up to about 3 weight % of Mn; from about 0.3 to about 2 weight % of Si; less than about 5 weight % of titanium, niobium and all other trace metals; and carbon in an amount of less than about 0.75 weight % the sum of the components adding up to 100 weight %.

The present invention also provides the above tube, comprising from about 40 to about 65 weight % of Co; from about 15 to about 20 weight % of Cr; from about 20 to about 13 weight % of Ni; less than about 4 weight % of Fe and the balance of one or more trace elements and up to about 20 weight % of W, the sum of the components adding up to 100 weight %.

The present invention also provides the above tube further comprising from about 0.2 up to about 3 weight % of Mn; from about 0.3 to about 2 weight % of Si; less than about 5 weight % of titanium, niobium and all other trace metals; and carbon in an amount of less than about 0.75 weight %.

The present invention also provides the above tube comprising from about 20 to about 38 weight % of chromium from about 25 to about 48 weight % of Ni.

The present invention also provides the above tube further comprising from about 0.2 up to about 3 weight % of Mn, from about 0.3 to about 2 weight % of Si; less than about 5 weight % of titanium, niobium and all other trace metals; and carbon in an amount of less than about 0.75 weight % and the balance substantially iron.

The present invention also provides the above tube wherein the cross section of the pin is round.

The present invention also provides the above tube wherein the cross section of the pin is oval.

The present invention also provides the above tube wherein the cross section of the pin is quadrilateral.

The present invention also provides the above tube wherein the pins in a linear array are of uniform height.

The present invention also provides the above tube wherein the spacing between pins in a linear array is from about 1.5 to about 3 times the cross-section of the pin.

The present invention also provides the above tube wherein the pins in a linear array are of different heights to provide a profile to the array.

The present invention also provides the above tube wherein at least part of the profile is a taper or curve (i.e., not the stud but the array may be tapered).

The present invention also provides the above tube wherein the central axis of the pin is at an angle from about 90° to about 60°, relative to the external surface of the tube.

The present invention also provides a method for making a tube as described above by welding (preferably, electrical) any stud shaped piece or strip to the surface of the tube and then, when required, cutting the stud shaped pieces at a desired length.

DETAILED DESCRIPTION

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

Figure 1:
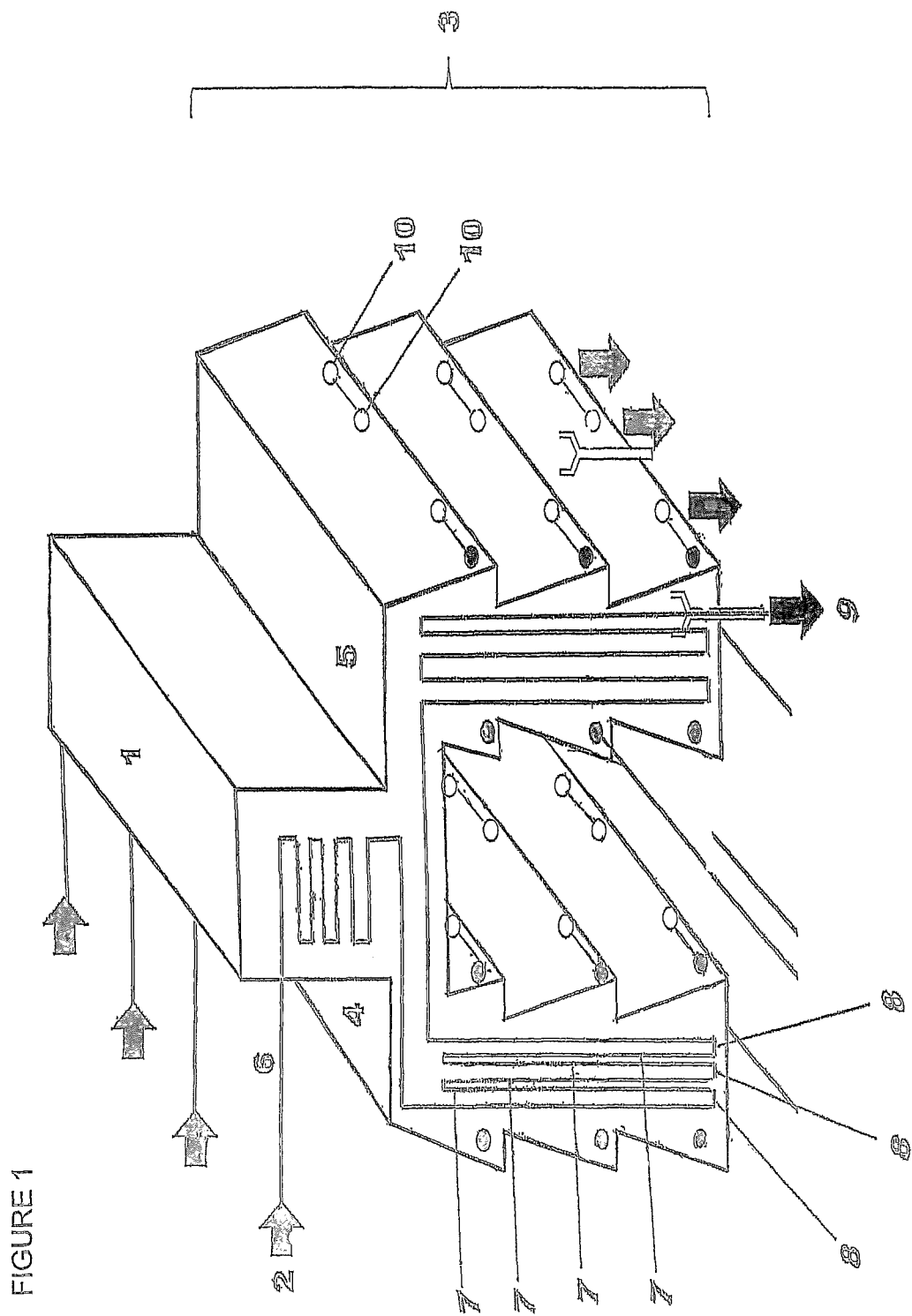
FIG. 1 is a schematic drawing of an ethylene cracker.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent. In the manufacture of ethylene, a feed typically selected from $C_{2-4}$ alkanes, and naphtha is fed into one or more furnace coils comprising straight tubes and "U" bends which pass through a cracking furnace. The furnace, schematically shown in FIG. 1, includes two main parts: the convection section (1) where the feed (2) is initially preheated and initial cracking may occur, and the radiant section (3) where most of the final cracking process takes place. The radiant section of the furnace comprises the inlet (4), located downstream of the convection section (1) which accounts for about half of the furnace radiant section and is sometimes referred to as a "cold" box, and the outlet (5) referred to as "hot" box. The feed flows through the process coil (6) which includes a long coil (7), suspended inside the inlet (4) and outlet (5) radiant sections of the furnace. To increase the length of the coil and, thus, to allow for the adequate residence time of the feed inside both radiant parts of the furnace, the coil comprises multiple vertical straight tubes (7), referred to as "passes", inter-connected by return bends (8) (U-shaped elbows). As the feed flows through the coil passes in the inlet radiant furnace section (4), it is heated approximately to the temperature at which cracking reactions begin and further cracking occurs. Next, the feed leaves the inlet radiant section and flows through the passes of the process coils in the furnace outlet radiant section (5). In this section, the feed is further heated, the cracking reaction is progressing, until the final products exit the coil (9) and are further treated (e.g., quenching and separation) and recovered downstream. In both parts of the furnace radiant section, the feed is heated by flames and by combustion gases generated by the burners (10) which are mounted on the furnace walls and on the furnace bottom. Heat transfer from combustion gases and flames to the processing coil (6) occurs predominantly by radiation and also, to a lesser extent, by the mechanism of forced convection. Flame and combustion gases heat not only the coils but also the furnace walls. The walls which are lined with a heat absorbing/radiating refractory, radiate heat on the coil, thus contributing to heating process of the flowing feed (2) as well.

If the efficiency of the heat transfer to the process coil in a furnace radiant section is maximized or just increased, fuel consumption by the burners may be reduced and, consequently, greenhouse gas emissions may be reduced. The increased efficiency of heat transfer in the radiant section may allow the fuel consumption to remain unchanged, while the furnace capacity may be increased. In this embodiment, higher feed flow rates can be cracked in the coil.

In another embodiment, at least a portion of the external surface of one or more passes of the coil or furnace tube is augmented with relatively small pins or studs in a longitudinal array (e.g., along the major axis of the tube).

In another embodiment, the pins or studs may have any cross-section such as a quadrilateral (e.g., rectangular or square) or round or oval. In some embodiments, the pin or stud can have a length from about 12 to about 50% of the outer diameter of the tube, or from about 2 to about 4.8 cm, or from about 0.80 inches to about 1.90 inches. The base of the pin may cover from about 0.1% to about 10%, or from about 1% to about 8%, or from about 2% to about 5% of the external cross section of the pipe or tube.

i) The length to diameter ratio of the pin may be from about 4:1 to about 2:1, or from about 4:1 to about 3:1.

ii) In a longitudinal array, the spacing of the pins may be from about 0.1 D to about 5 D (where D is the diameter of the pin) to, or from about 0.5 D to about 5 D, or from about 1 D to about 3 D. In any array, the spacing of the pins need not be uniform. For example, the spacing could be wider at the middle of the tube and closer towards the end of the tube. In some embodiments, the spacing of the pins may increase the heat flux into the tube. While the pins may be perpendicular to the surface of the tube, they may also be at an angle. For example, the pins may be at an angle of about 90° to about 60° relative to the surface of the tube. In some embodiments, the pins or studs have a uniform cross section along their length (i.e., circular, parallelogram (rectangle or square) or oval) and are not tapered.

In some embodiments, the longitudinal arrays may be radially spaced apart along the surface of the tube by an angle from about 30° to about 120°. In some embodiments, there may be from about 12 to about 3 longitudinal arrays on a pipe, or from about 4 to about 8 longitudinal arrays (e.g., radially spaced from about 90° to about) 40°. The arrays need not be circularly parallel. In some embodiments, adjacent arrays could be offset so that the pins in one array match spaces in an adjacent array. In some embodiments, an array need not be uniform in height along its entire length. In some embodiments, the array could have one or more sections of reduced height. For example, the array could reduce from a maximum height in the middle to a minimum height at each end (an inward facing parabola) or vice versa (an outward facing parabola).

In one embodiment, the location and arrangement of the arrays of pins are selected to maximize radiant and convective heat flux into the coil. The location of the arrays and spacing and heights of the pins need not be uniform.

In one embodiment, the pins absorb more radiant energy than they radiate. In this example, the transfer of heat through the base of the pin into the coil must exceed that transferred to the equivalent surface on a bare coil at the same operational conditions. If the concentrations of the pins become excessive or if their geometry (height and diameter) is not optimized, the pins may start to reduce heat transfer, due to thermal effects of excessive conductive resistance. In some embodiments, the pins are designed and manufactured to increase net radiation and convective heat transferred to a coil from surrounding flowing combustion gasses, flame and furnace refractory. Without wishing to be bound by theory, it is believed that the positive impact on radiation heat transfer results when more heat is absorbed through the increased coil external surface so the contact area between combustion gases and coil is increased, and also when the relative heat loss through the radiating coil surface is reduced. In some embodiments, the coil surface is not smooth or does not remain smooth. In some embodiments, as a pin radiates energy to its surroundings, part of this energy is delivered to and captured by other pins, thus, it is re-directed back to the coil surface. In some embodiments, the pins may also increase the convective heat transfer to a coil, due to increase in coil external surface that is in contact with flowing combustion gas, and/or due to increases in turbulence along the coil surface and reduction to the thickness of a boundary layer.

The pins may comprise up to about 10% to about 35% of the weight of the coil pass (7). The creep of the coil pass (7) given the additional weight of the pins should be considered. It is likely that an array of pins will place less stress on the coil pass than a continuous fin (e.g., there is less mass to support), which may also affect the location and concentration of the pins. As a result, creep may be reduced if there are more pins on the upper surface of the pass. In an embodiment, the pins have the same composition as the material of the pass (7) of the radiant coil.

In one embodiment, the tube may be manufactured by welding (electrically) any stud shaped strip (e.g., a wire or a welding rod) to the surface of the tube at a desired location and then, when required, cutting the strip at the desired length. In stud (arc) welding, a stud of a predetermined length is electrically welded to the substrate as a result, cutting to length may be unnecessary.

In some embodiments, the pass of the coil may be a tube of a stainless steel. In some embodiments, the coil may be a tube of wrought stainless, austentic stainless steel, HP, HT, HU, HW, HX stainless steel, heat resistant steel, or nickel based alloys. In some embodiments, the coil pass may be a high strength low alloy steel (HSLA), high strength structural steel or ultra high strength steel. The classification and composition of such steels are known to those skilled in the art.

In one embodiment, the stainless steel, for example, heat resistant stainless steel, comprises from about 13 to about 50 weight %, or from about 20 to about 50 weight %, or from about 20 to about 38 weight % of chromium. The stainless steel may further comprise from about 20 to about 50 weight %, or from about 25 to about 50 weight %, or from about 25 to about 48 weight %, or from about 30 to about 45 weight % of Ni. The balance of the stainless steel may be substantially iron.

In some embodiments, nickel and/or cobalt based extreme austentic high temperature alloys (HTAs) are also useful. In some embodiments, the alloys comprise a major amount of nickel or cobalt. In some embodiments, the high temperature nickel based alloys comprise from about 50 to about 70, preferably from about 55 to about 65 weight % of Ni; from about 10 to about 20 weight % of Cr; from about 10 to about 20 weight % of Co; and from about 5 to about 9 weight % of Fe and the balance comprises one or more of the trace elements noted below to bring the composition up to 100 weight %. In some embodiments, the high temperature cobalt based alloys comprise from about 40 to about 65 weight % of Co; from about 15 to about 20 weight % of Cr; from about 13 to about 20 weight % of Ni; less than about 4 weight % of Fe and the balance comprises one or more trace elements as set out below and up to about 20 weight % of W. The sum of the components adding up to 100 weight %.

In some embodiments, the steel may further comprise a number of trace elements including from about 0.2 weight % to about 3 weight %, or from about 1.0 weight % to about 2.5 weight %, or not more than about 2 weight % of manganese; from about 0.3 weight % to about 2 weight %, or from about 0.8 weight % to about 1.6 weight %, or less than 1.9 weight % of Si; less than about 3 weight %, or less than about 2 weight % of titanium; less than about 2.0 weight %, or less than 1.5 weight % of niobium and all other trace metals; and carbon in an amount of less than about 2.0 weight %. The trace elements are present in amounts so that the composition of the steel totals 100 weight %.

The present invention will further be described by reference to the following examples. The following examples are merely illustrative of the invention and are not intended to be limiting. Unless otherwise indicated, all percentages are by weight unless otherwise specified.

EXAMPLES

Example 1

A finite element model of the ethylene 1 furnace tubes was performed in ANSYS Mechanical 14.0. This is a commercial finite element analysis (FEA) software used to create numerical models for stress/strain and heat transfer analysis.

Figure 2:
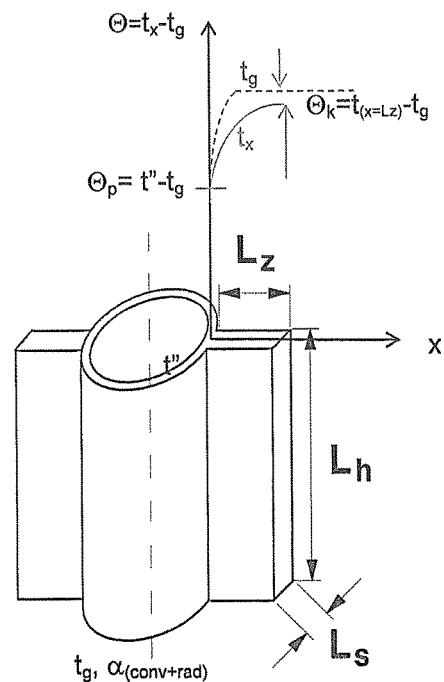
FIG. 2 shows the geometry of a single longitudinal vertical fin with rectangular cross section.

Prior to performing a FEA analysis, a heat transfer model of a rectangular fin (FIG. 2) was created for a one-dimensional heat distribution. The net heat conducted through the fin is equal to heat transferred to the fin external surface from surroundings, 1. $Q_{x+dx} - Q_x = Q_\alpha$:

$$\frac{d}{dx}\left(A\frac{d\Theta}{dx}\right) = \frac{\alpha\,O}{\lambda}\Theta$$

Where $\Theta = t_g - t_x$, the temperature difference between combustion gases, $t_g$, and local temperature in the fin, $t_x$, at location $x$ ($0 \le x \le L_z$)
i) $O = 2(L_s + L_h)$—the perimeter of the cross section of the rectangular fin,
$\lambda$—thermal conductivity of the fin material,
$\alpha$—total heat transfer coefficient ($\alpha = \alpha_{rad+conv}$)

From the above equation $$\frac{d^2\Theta}{dx} = B^2\Theta \qquad \text{i)}$$

where:

$$B \equiv \sqrt{\frac{\alpha\,O}{\lambda\,A}}$$

The general solution of this equation takes the form:

$$\Theta_x = C_1 e^{Bx} + C_2 e^{-Bx}$$

where the constants $C_1$ and $C_2$ are determined from two boundary conditions:
for $x=0$ $\Theta = \Theta_p = C_1 + C_2$
for $x=L_z$ $\Theta = \Theta_k = C_1 e^{BL} + C_2 e^{-BL}$
and, $$Q_\lambda = Q_\alpha$$
$$= -A\lambda\left(\frac{d\Theta}{dx}\right)_{x=Lz}$$
$$= A\alpha\Theta_k$$

So, after calculating $C_1$ and $C_2$, the temperature distribution in the fin takes the form:

$$\Theta_x = \Theta_p$$
$$= \frac{\cosh[B(L_z - x)] + \frac{\alpha}{B\lambda}\sinh[B(L_z - x)]}{\cosh BL_z + \frac{\alpha}{B\lambda}\sinh BL_z}$$

Figure 3:
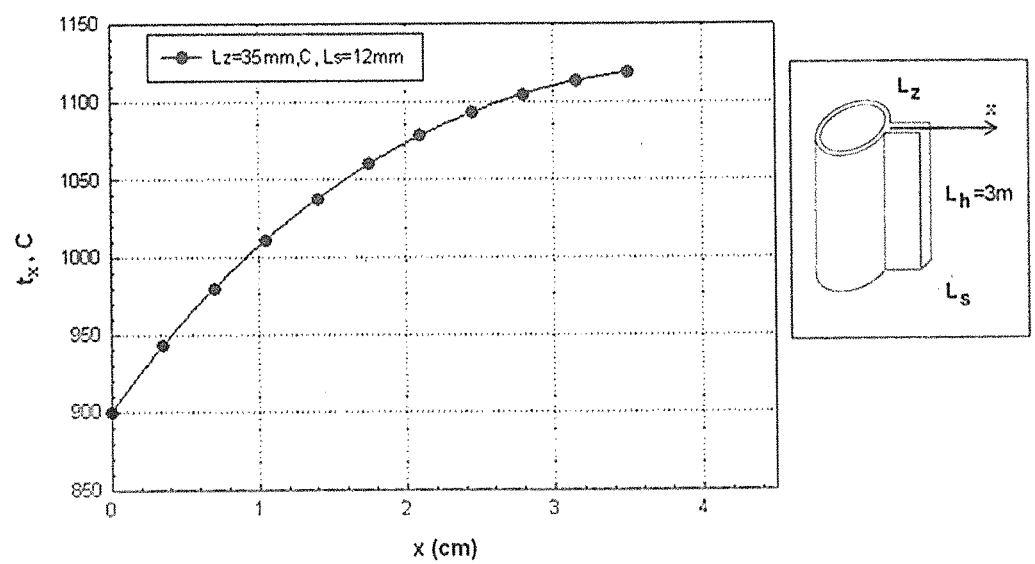
FIG. 3 shows an axial fin temperature distribution with increasing height of the fin.

This temperature distribution is shown in FIG. 3 for a base temperature of 900° C. which was used for generating temperature loads on the axial finned tube.

Figure 4A:
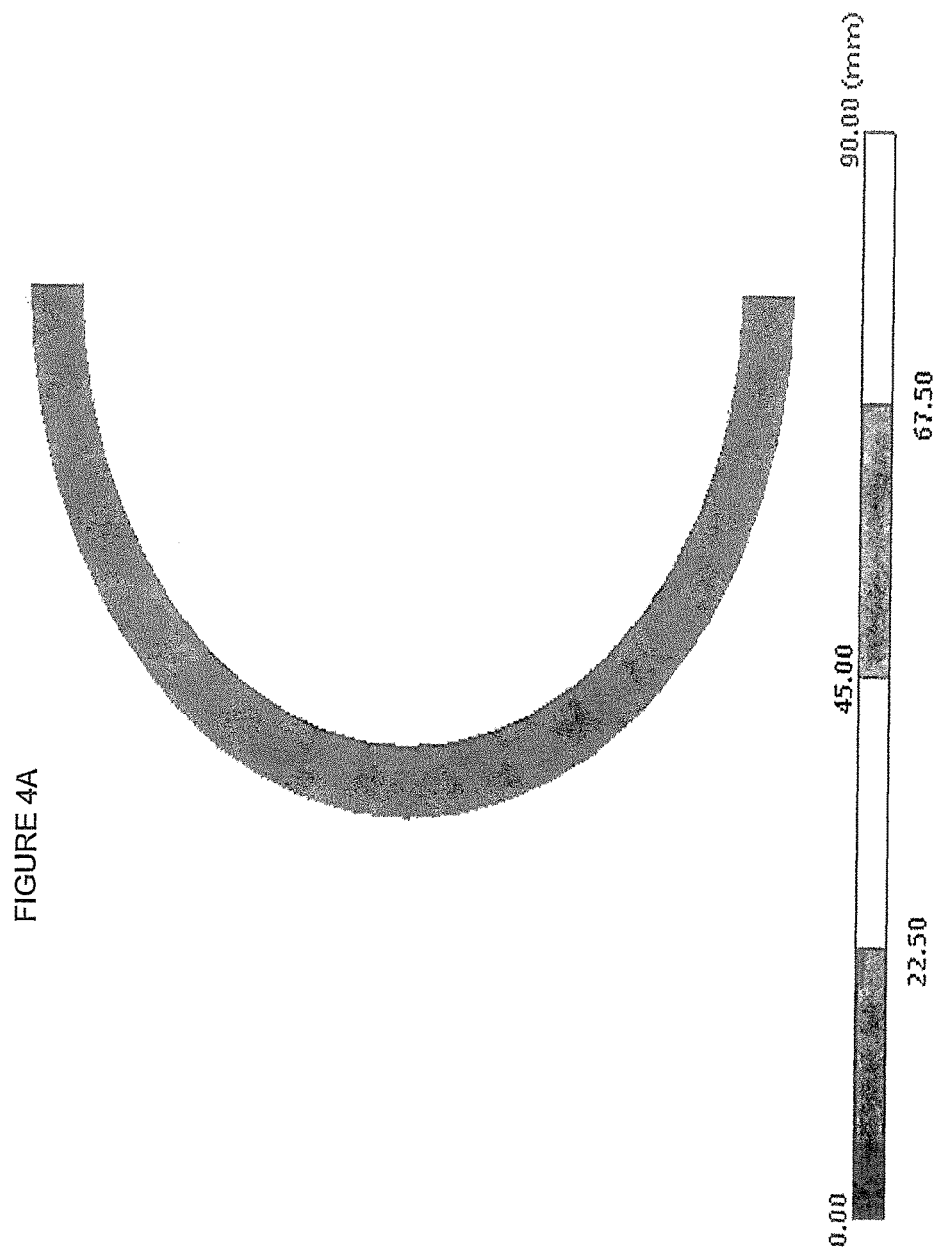
FIG. 4 shows a half cross section of bare tube (FIG. 4A), axial finned tube (FIG. 4B), and pinned tube (FIG. 4C).
Figure 4B:
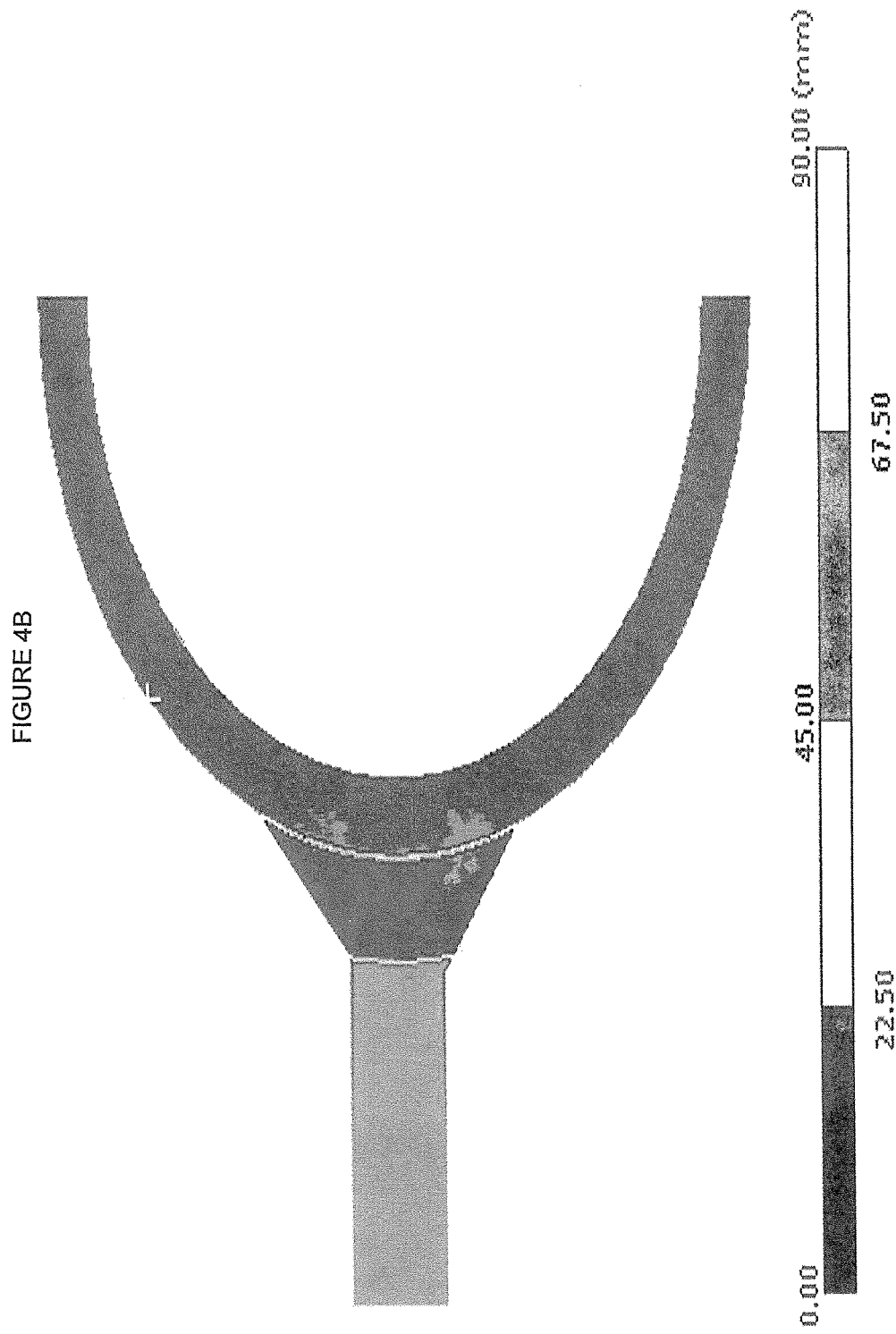
Figure 4C:
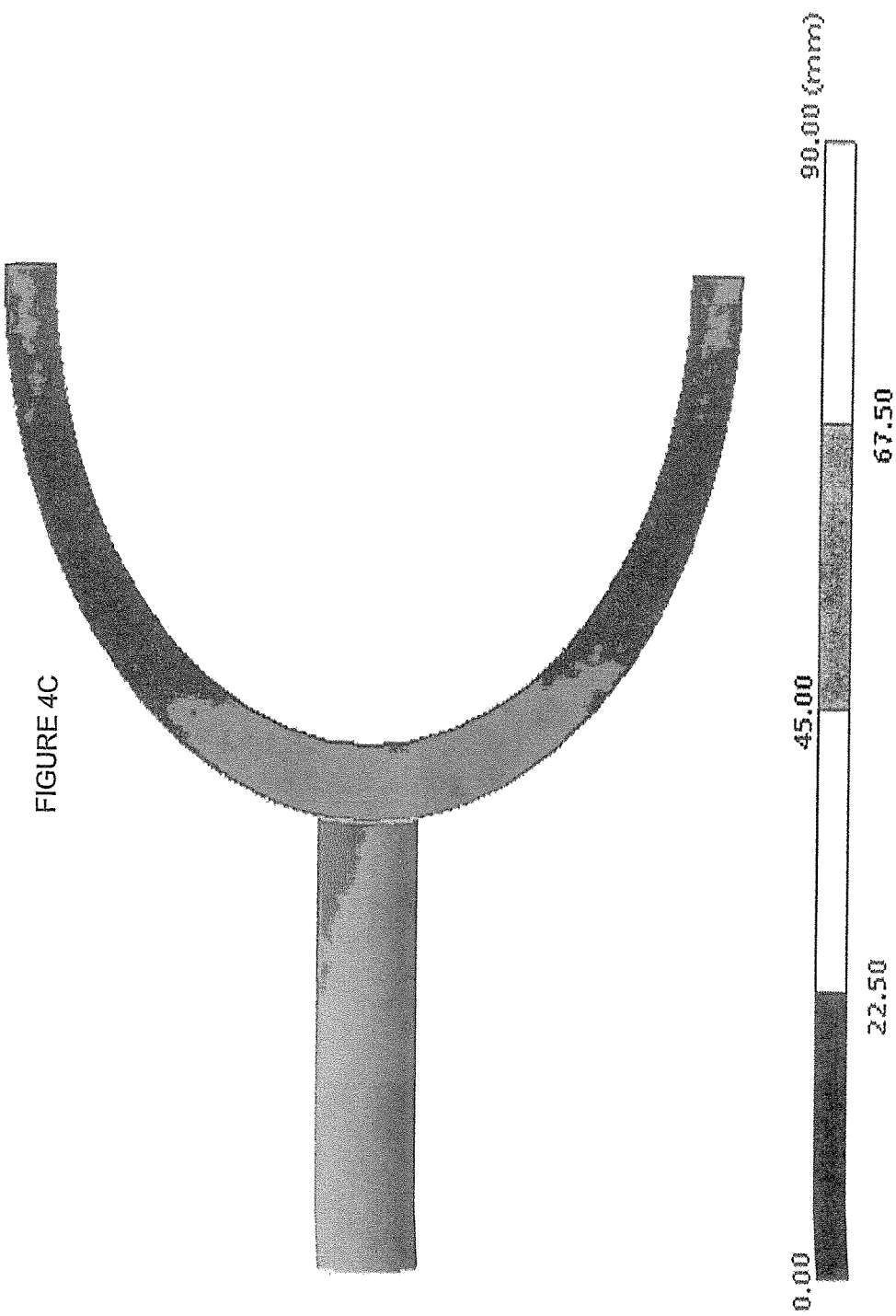
Figure 5A:
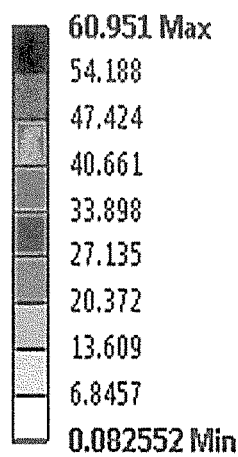
FIG. 5 shows the outside wall stress distribution for bare tube (FIG. 5A), axial finned tube (FIG. 5B), and pinned tube (FIG. 5C).
Figure 5A:
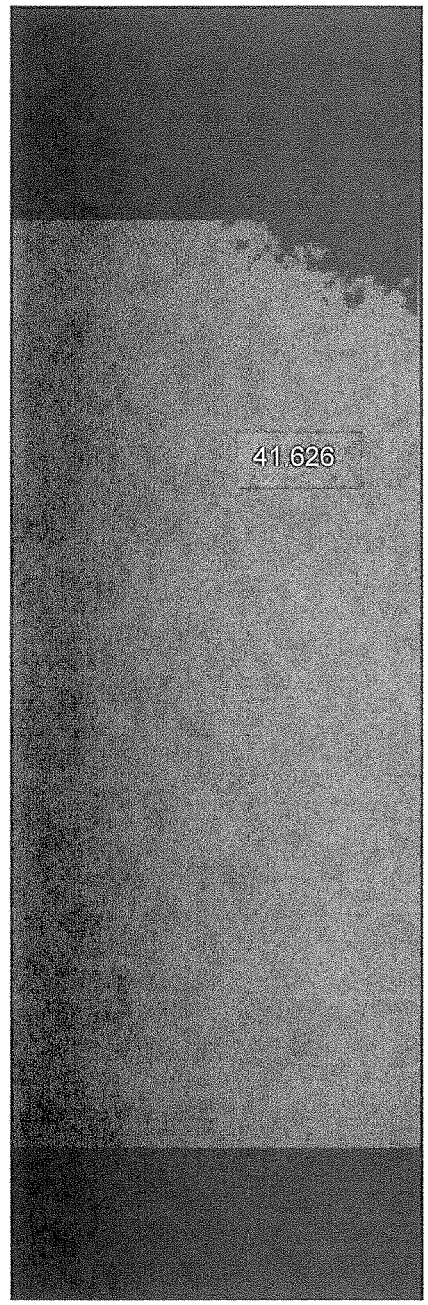
Figure 5B:
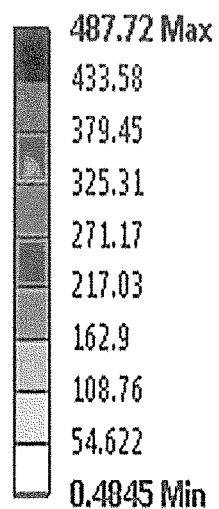
Figure 5B:
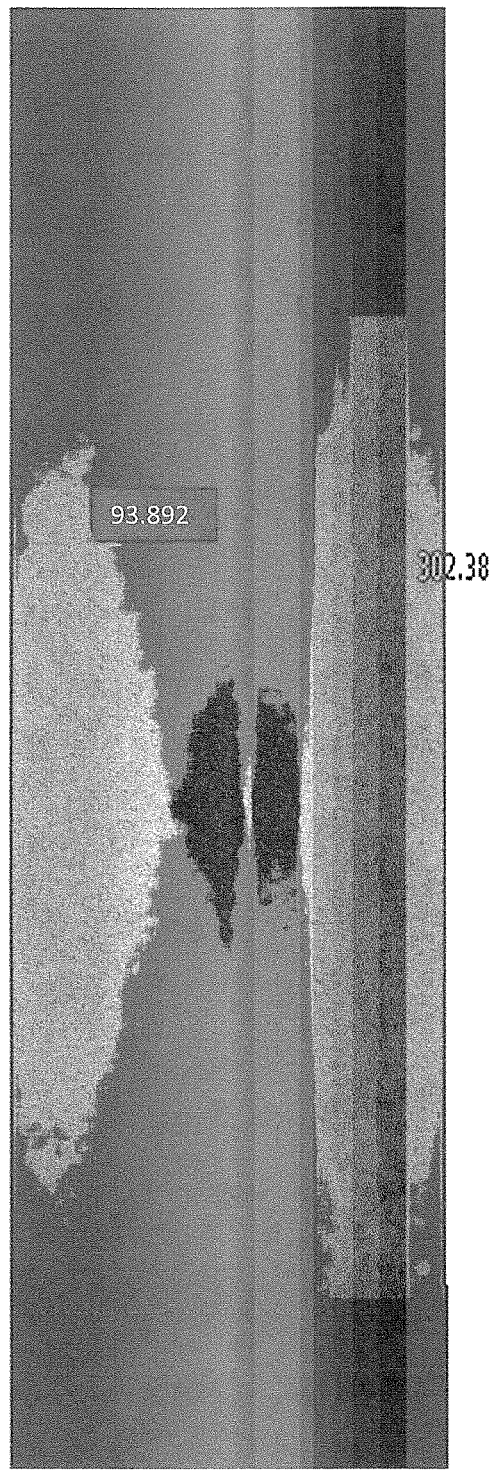
Figure 5C:
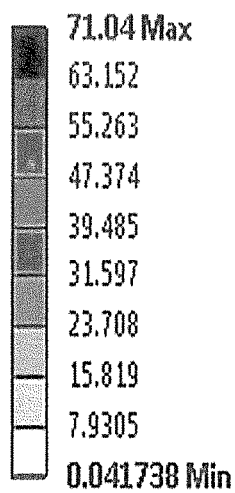
Figure 5C:
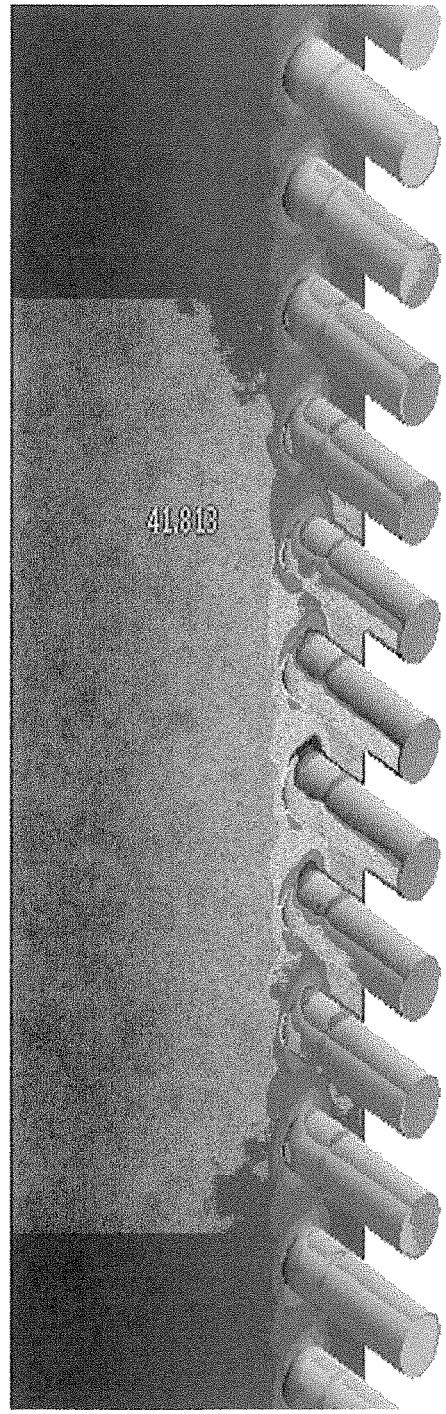
Figure 6A:
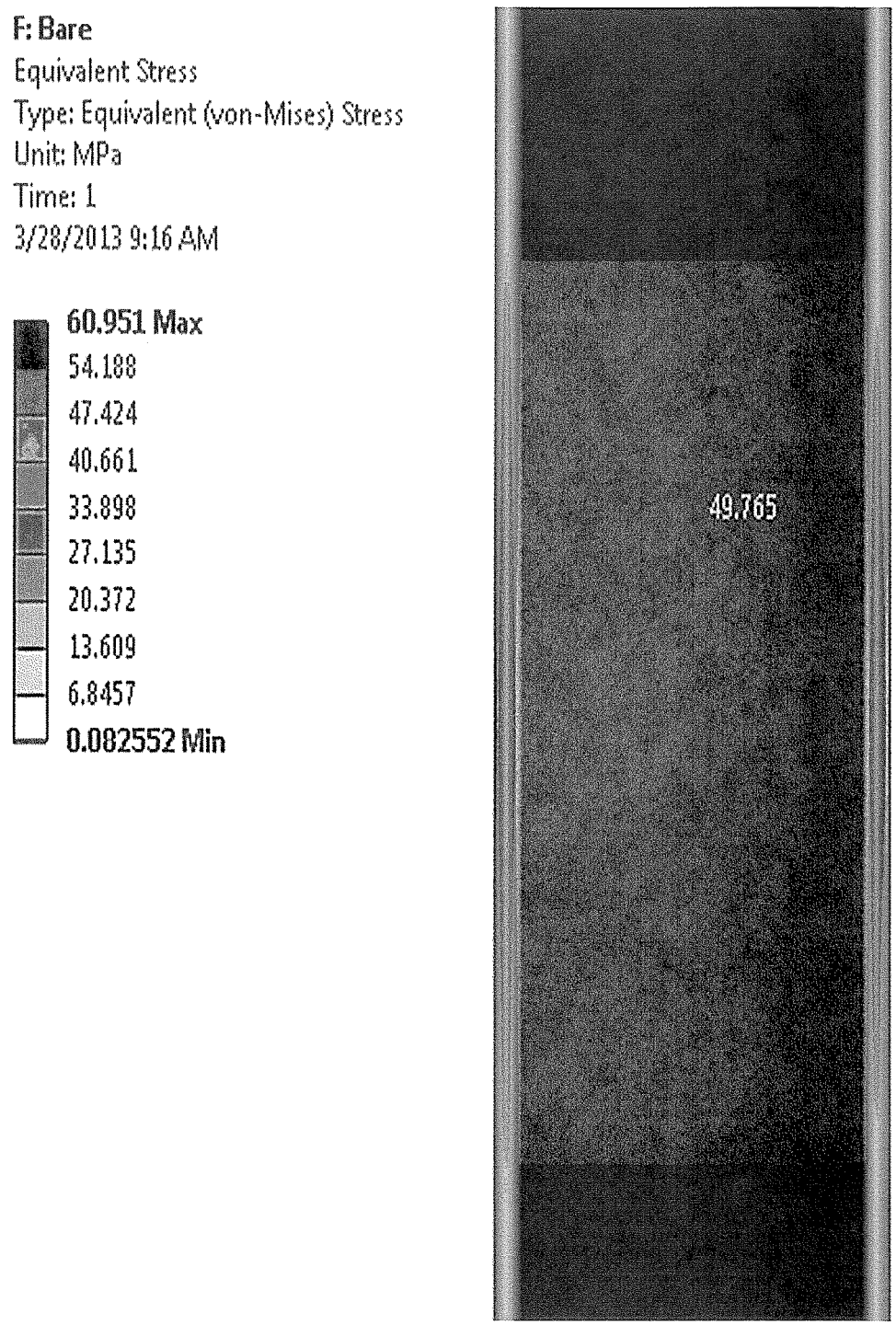
FIG. 6 shows the inside wall stress distribution for bare tube (FIG. 6A), axial finned tube (FIG. 6B), and pinned tube (FIG. 6C).
Figure 6B:
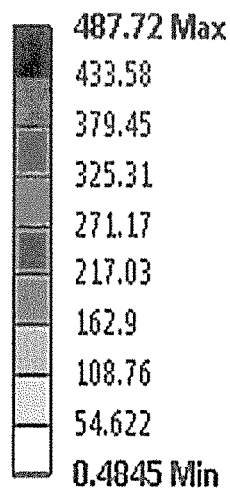
Figure 6B:
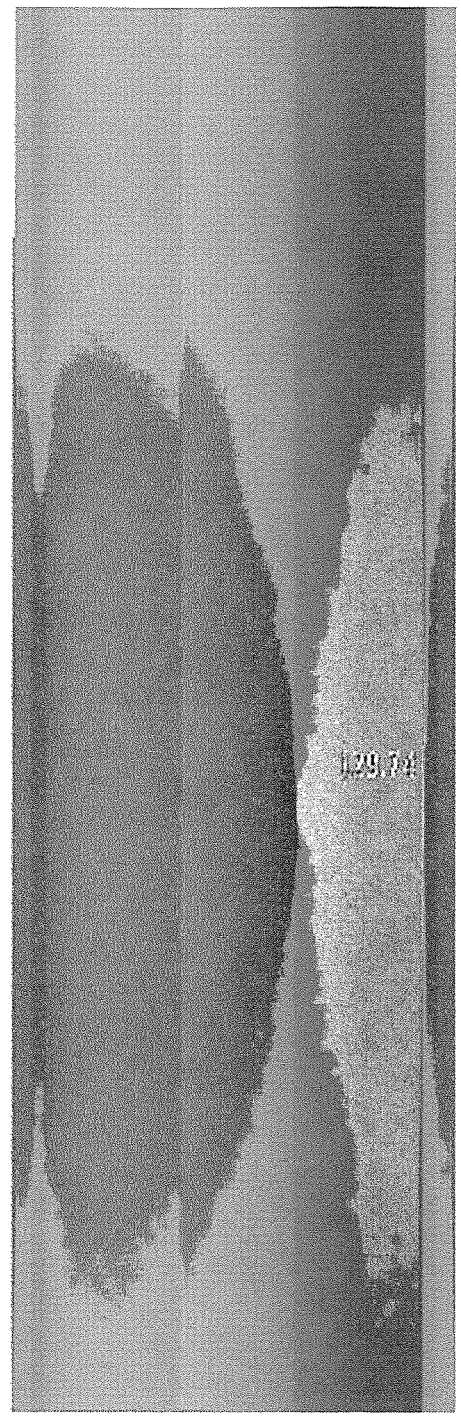
Figure 6C:
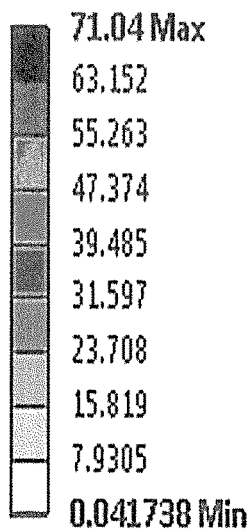
Figure 6C:
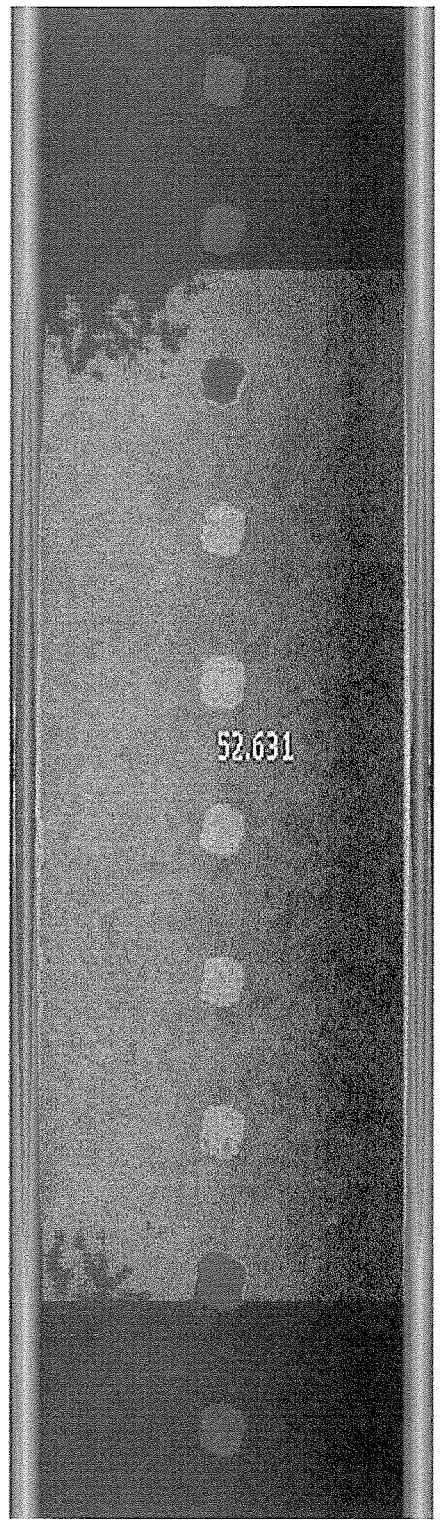

A static structural FEA was performed on three different furnace tubes; a bare tube, an axial finned tube, and a pinned tube. Half models were created with symmetric boundary conditions. A cross section of each of the tubes is shown in FIGS. 4A, 4B and 4C. The temperature distribution described above was applied to the external surface of the finned and pinned tube. Since the above heat transfer analysis was not performed for a pinned tube, the external surfaces of the pinned tube were assumed to follow the same distribution. An average process temperature of approximately 750° C. and an average convective heat transfer coefficient of 998 W/m²K were used to define the thermal boundary condition on the inner surface of the tube. Both gravity and an internal tube pressure of 0.336 MPa were also applied to the furnace tube model. The temperature distribution described above was determined for an axial finned tube and the assumption was made that the distribution would be similar in a pinned tube.

External and internal stress distributions are shown in FIGS. 5A, 5B and 5C, and FIGS. 6A, 6B, and 6C. As seen in these figures, the finned furnace tube is in a much higher state of stress than the bare furnace tube. The difference in thermal expansion of the tip and base of the axial fin causes the base tube to be put in a high state of tension.

The advantage of the pinned tube is that it is not constrained in any direction and is free to expand. There is a slight stress concentration at the base of the pin; however the overall state of stress is much lower than that of the axial finned tube. The overall state of stress in the furnace tube is comparable to that of a bare tube. However, there is an increase in heat transfer in the pinned tube over the bare tube.

The present invention has been described with reference to certain details of particular embodiments thereof. It is not intended that such details be regarded as limitations upon the scope of the invention except insofar as and to the extent that they are included in the accompanying claims.

What is claimed is:

1. A tube for use in the radiant section of a furnace for cracking hydrocarbons to produce olefins having on its exterior surface a series of pins in one or more linear arrays parallel to and substantially the length of the longitudinal axis of the tube, said pins having:
    i) a maximum height from about 12% to about 50% of tube outer diameter of the tube;

ii) a contact surface with the tube, having an area from about 0.1% to about 10% of the tube external cross section area;

iii) length to diameter ratio from about 4:1 to about 3:1; and iv) an arrangement into a linear array of different heights to provide a profile to the array;

wherein the distance between consecutive pins with a given linear array is from about 1 to about 5 times the maximum cross section of the pin.

2. The tube according to claim 1, wherein the pins have a maximum height from about 12% to about 50% of the tube outer diameter.

3. The tube according to claim 1 comprising from about 55 to about 65 weight % of Ni; from about 20 to about 10 weight % of Cr; from about 20 to about 10 weight % of Co; and from about 5 to about 9 weight % of Fe and the balance one or more of the trace elements.

4. The tube according to claim 3 further comprising from about 0.2 up to about 3 weight % of Mn; from about 0.3 to about 2 weight % of Si; less than about 5 weight % of titanium, niobium and all other trace metals; and carbon in an amount of less than about 0.75 weight % the sum of the components adding up to 100 weight %.

5. The tube according to claim 1, comprising from about 40 to about 65 weight % of Co; from about 15 to about 20 weight % of Cr; from about 20 to about 13 weight % of Ni; less than about 4 weight % of Fe and the balance of one or more trace elements and up to about 20 weight % of W the sum of the components adding up to 100 weight %.

6. The tube according to claim 5, further comprising from about 0.2 up to about 3 weight % of Mn; from about 0.3 to about 2 weight % of Si; less than about 5 weight % of titanium, niobium and all other trace metals; and carbon in an amount of less than about 0.75 weight %.

7. The tube according to claim 1, comprising from 20 to 38 weight % of chromium and from 25 to 48 weight % of Ni.

8. The tube according to claim 7, further comprising from about 0.2 up to about 3 weight % of Mn, from about 0.3 to about 2 weight % of Si; less than about 5 weight % of titanium, niobium and all other trace metals; and carbon in an amount of less than about 0.75 weight % and the balance substantially iron.

9. The tube according to claim 1, wherein the cross section of the pin is round.

10. The tube according to claim 1, wherein the cross section of the pin is quadrilateral.

11. The tube according to claim 1, wherein the cross section of the pin is oval.

12. Tube according to claim 1, wherein the pins in a linear array are of uniform height.

13. The tube according to claim 1, where in the spacing between pins in a linear array is from about 1.5 to about 3 times the cross section of the pin.

14. The tube according to claim 1, wherein at least part of the profile is a taper.

15. The tube according to claim 1, wherein the central axis of the pin is at an angle from about 90° to about 60° relative to the external surface of the tube.

* * * * *